United States Patent [19]

Gertz et al.

[11] 4,352,484
[45] Oct. 5, 1982

[54] SHEAR ACTION AND COMPRESSION ENERGY ABSORBER

[75] Inventors: David C. Gertz, Citrus Heights; Owen S. Denman, Sacramento, both of Calif.

[73] Assignee: Energy Absorption Systems, Inc., Chicago, Ill.

[21] Appl. No.: 184,236

[22] Filed: Sep. 5, 1980

[51] Int. Cl.³ .............................................. E01F 15/00
[52] U.S. Cl. ..................................... 256/13.1; 256/1; 52/309.4; 104/254; 114/219; 188/377; 293/133; 404/6
[58] Field of Search ...................... 256/13.1, 1; 404/6, 404/10; 293/133; 188/377; 267/140, 139; 2/411, 412, 414; 52/309.4; 114/219; 104/254

[56] References Cited

U.S. PATENT DOCUMENTS

| | | |
|---|---|---|
| Re. 29,544 | 2/1978 | Fitch . |
| 1,996,490 | 4/1935 | Romanoff . |
| 2,171,358 | 8/1939 | Le Gall . |
| 2,501,180 | 3/1950 | Kunz . |
| 2,654,686 | 10/1953 | Hansen . |
| 2,836,863 | 6/1958 | Denker . |
| 2,860,740 | 11/1958 | Holland et al. . |
| 2,960,197 | 11/1960 | Langhans . |
| 3,010,540 | 11/1961 | Dahlen . |
| 3,070,480 | 12/1962 | Breiner . |
| 3,082,846 | 3/1963 | Jensen et al. . |
| 3,104,194 | 8/1963 | Zahorski . |
| 3,195,686 | 7/1965 | Johnson . |
| 3,227,429 | 1/1966 | Renzi . |
| 3,251,076 | 5/1966 | Burke . |
| 3,256,001 | 6/1966 | Renzi . |
| 3,265,163 | 8/1966 | Gilbert et al. . |
| 3,402,105 | 9/1968 | Sze . |
| 3,447,163 | 6/1969 | Bothwell et al. . |
| 3,506,295 | 4/1970 | Yancey ................................ 293/133 |
| 3,523,858 | 8/1970 | Schudel . |
| 3,533,894 | 10/1970 | Engelbrecht et al. . |
| 3,574,103 | 4/1971 | Latkin . |
| 3,587,787 | 6/1971 | Rich et al. . |
| 3,606,258 | 9/1971 | Fitch . |
| 3,643,924 | 2/1972 | Fitch . |
| 3,666,055 | 5/1972 | Walker et al. . |
| 3,666,310 | 5/1972 | Burgess et al. . |
| 3,695,583 | 10/1972 | Walker et al. . |
| 3,768,781 | 10/1973 | Walker et al. . |
| 3,783,968 | 1/1974 | Derry . |
| 3,787,083 | 1/1974 | Perlberg . |
| 3,847,426 | 11/1974 | McGettigan . |
| 3,852,150 | 12/1974 | Weller . |
| 3,856,268 | 12/1974 | Fitch . |
| 3,880,404 | 4/1975 | Fitch . |
| 3,888,531 | 6/1975 | Straza et al. . |
| 3,933,387 | 1/1976 | Salloum et al. . |
| 3,944,187 | 3/1976 | Walker . |
| 3,982,734 | 9/1976 | Walker . |
| 3,997,207 | 12/1976 | Norlin . |
| 4,029,350 | 6/1977 | Goupey et al. . |
| 4,072,334 | 2/1978 | Seegmiller et al. . |
| 4,134,610 | 1/1979 | Lindewall . |
| 4,149,649 | 4/1979 | Szego . |
| 4,154,469 | 5/1979 | Goupy et al. ..................... 293/133 X |
| 4,227,593 | 10/1980 | Bricmont et al. ............... 293/133 X |

FOREIGN PATENT DOCUMENTS

| | | |
|---|---|---|
| 157430 | 1/1922 | United Kingdom . |
| 678223 | 8/1979 | U.S.S.R. ............................. 188/377 |

OTHER PUBLICATIONS

Hi-Dri Cushion System.
Construction Zone G-R-E-A-T.
The Hi-Dri Cell.
The G-R-E-A-T System.
The Hi-Dro Cell Cluster Unit.
Guard Rail Energy Absorbing Terminal and Crash Cushion.

Primary Examiner—James Kee Chi
Attorney, Agent, or Firm—Hume, Clement, Brinks, Willian & Olds, Ltd.

[57] ABSTRACT

An energy absorbing apparatus is provided to dissipate the energy of the impact force of a vehicle. A plurality of energy absorbing sheets are arranged in a stacked relation to resist the impact force and to thereby dissipate the energy of the force. Each sheet has a honeycomb structure of hexagonal cells that are filled with a deformable material such as polyurethane foam and that are defined by walls of relatively rigid material. In operation, an impact force is applied to the stack of energy absorbing sheets and each sheet is thereby caused to cut or shear into its abutting sheet so that at least a portion of the energy of the impact force is dissipated. As the stacked sheets cut into one another, the energy of the force is further dissipated by the compression of the polyurethane foam of the sheets.

16 Claims, 8 Drawing Figures

FIG. 4
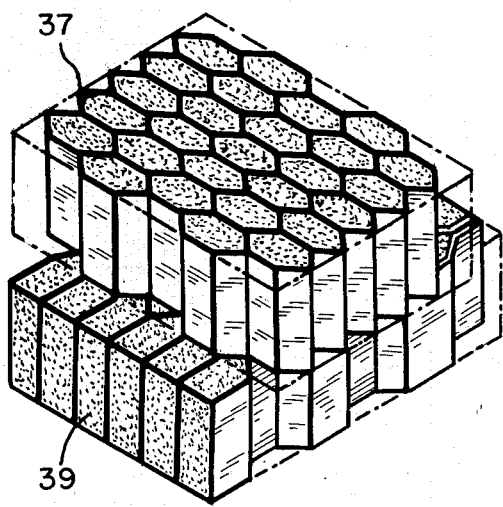
FIG. 5
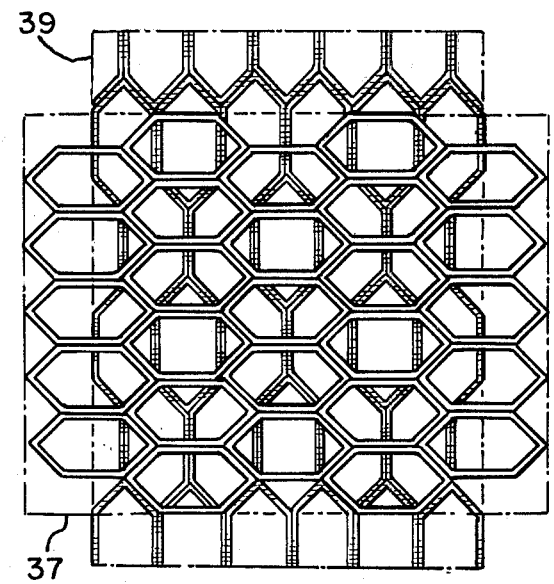
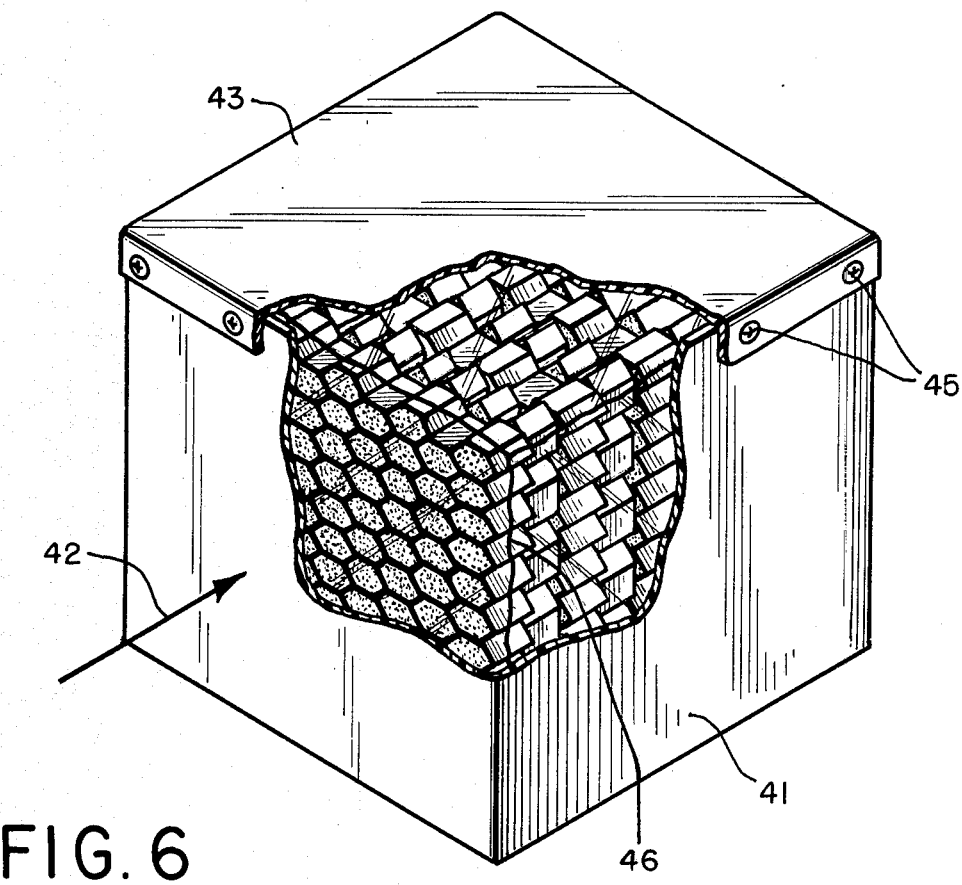
FIG. 6

SHEAR ACTION AND COMPRESSION ENERGY ABSORBER

TECHNICAL FIELD

The invention relates to apparatus and materials for absorbing and dissipating the impact energy of automobiles or other moving vehicles. More particularly, the invention relates to a energy absorbing structure wherein a plurality of sheets having foam-filled cells are arranged in a stack to absorb an impact force. The energy is absorbed when the foam is compressed and when the walls of the sheets cut into one another.

BACKGROUND OF THE INVENTION

It has long been known that the impact energy of an automobile may be dissipated if the automobile hits and crushes a deformable structure or material. Thus, it is known in the art that light weight cement, plastic foam and various fibrous materials may be used to absorb impact energy. Also, various structures such as foam-filled honeycomb arrays have been employed to absorb impact energy by compression.

Moreover, impact energy may be absorbed by the cutting or shearing of relatively rigid energy absorbing structures. For example, as shown in the U.S. Pat. No. to John W. Rich, 3,587,787, a plurality of sheets with intersecting walls may be stacked so that the walls of adjacent sheets cut into one another to dissipate the energy of an incident impact force. It has been found that the energy dissipation of such structures is reduced when a compressive force causes the walls of the sheets to crumple, rather than to cut or shear. Also, the walls of the sheets may expand or contract in response to ambient temperature and moisture conditions and thereby reduce the effectiveness of the energy absorption structure. Moreover, the rigidity and strength of such structures is generally limited and, therefore, the structures may not operate to cut or shear in an optimum manner.

A preferred energy absorber for high-impact energy vehicles such as automobiles or trucks should uniformly and completely crush in order to absorb a maximum impact energy and should provide a force absorption characteristic that increases as the distance travelled by the impacting vehicle increases. The material of such an absorber should provide a high energy absorption per square inch, so that energy absorbing structures may be made as small as possible.

Accordingly, it is an object of the invention to provide an energy absorption apparatus and material that is relatively compact and that operates to uniformly and consistently absorb the impact energies of vehicles such as cars and trucks.

A further object of the invention is to provide an energy absorber that utilizes both shear action and compression to absorb the energy of an impact force.

Another object of the invention is to provide an energy absorber that utilizes the favorable energy absorption characteristic of cutting or shearing lattices and avoids the shearing inefficiencies presently associated with such structures.

A further object of the invention is to provide an energy absorption structure wherein stacked sheets with foam-filled honeycomb cells are caused to cut or shear into one another in response to an applied impact force, so that the energy of the impact is uniformly and efficiently dissipated.

SUMMARY OF THE INVENTION

In order to achieve the objects of the invention and to overcome the problems of the prior art, the improved shock absorbing apparatus of the invention includes a plurality of energy absorbing sheets that are arranged in a stacked relation to dissipate the energy of an impact force. Each sheet has an array of intersecting walls that define a plurality of cell areas. A deformable filler material, for example polyurethane foam, fills the cell areas of the sheets.

In operation, the edges of the walls of abutting sheets are oriented to engage and to cut into one another and into the filler material to dissipate the energy of an impact force. Also, the deformable filler material is crushed to further dissipate the energy of the impact force.

In a preferred embodiment of the invention, the energy absorbing sheets are formed as a honeycomb lattice of hexagonal cells that are uniformly aligned with cell faces lying in the plane of the face of the sheet and the cell walls extending to define cutting edges. Also, abutting sheets in the stack are angularly displaced 90° with respect to one another. The variation in the orientation of the sheets ensures that an impact force will cause the sheets to uniformly cut or shear into one another.

The stacked sheets are placed in a deformable container such as a polyethylene box and several of such loaded boxes are supported in alignment in a retaining frame. The retaining frame has a plurality of nested retaining units that support the loaded deformable boxes and that telescope to successively crush the boxes in response to an axial impact force.

The retaining frame is slidably supported on a rigid support surface by a plurality of legs. Each leg has a forwardly extending peg, a ring that is slidably engaged with the peg, and a chain that is affixed at one end to the ring and at the other end to the support surface. If a vehicle hits the retaining frame transversely, the chains attached to the legs of the frame will hold the frame in a fixed position to resist the associated transverse force and to thereby deflect the vehicle. However, if an axial force is applied, the ring ends of the chains will drop from the pegs and the frame will thereby be allowed to telescope in the axial direction.

Although a deformable polyurethane material is preferably foamed in the hexagonal cell areas of the energy absorbing sheets, in an alternative embodiment of the invention the stacked sheets are constructed with empty cells and a foam panel is placed between successive sheets. An impact force causes the empty cells of the sheets to cut into the foam panel until the cells are filled with foam. Thereafter, the walls of the cells cut into one another and into the foam to absorb impact energy.

BRIEF DESCRIPTION OF THE DRAWINGS

FIG. 4 is a perspective view of two abutting energy absorbing sheets having a honeycomb structure of hexagonal, foam-filled cells.

FIG. 5 is a top elevation view of the stacked sheets of FIG. 4.

FIG. 6 is a perspective view of a container for the energy absorbing sheets of the invention.

DETAILED DESCRIPTION OF PREFERRED EMBODIMENTS

Figure 1:
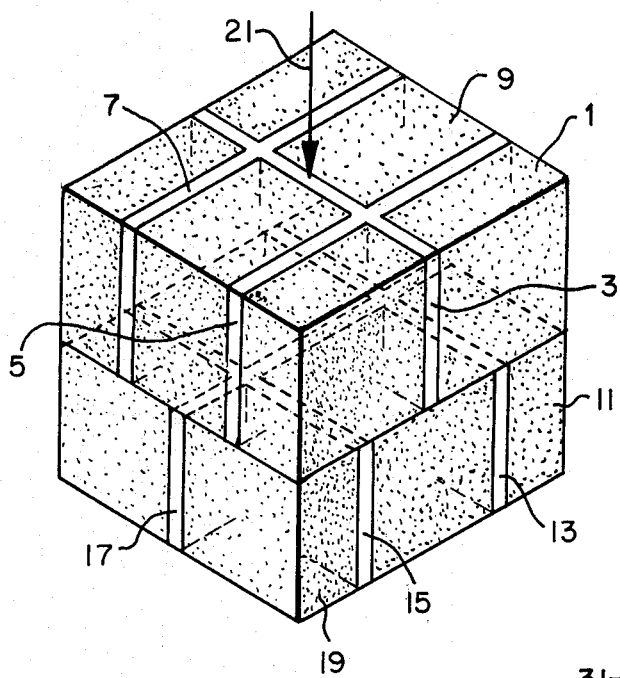
FIG. 1 illustrates a perspective view of two abutting energy absorbing lattice sheets having rectangular cells.

The remaining portion of this specification will describe preferred embodiments of the invention when read in conjunction with the attached drawings, in which like reference characters identify identical apparatus.

FIG. 1 illustrates a perspective view of two stacked energy absorbing sheets in accordance with the invention. A top sheet 1 is comprised of three intersecting walls 3, 5 and 7 that are disposed in a block 9 of deformable material, for example polyurethane foam. The walls 3, 5, and 7 define separate cell areas within the foam. A bottom energy absorbing sheet 11 abuts the top sheet 1 and includes three intersecting walls 13, 15 and 17 that define cell areas within a corresponding polyurethane foam block 19.

The walls 1, 3, 5, 13, 15 and 17 may be made of fairly rigid material, for example cardboard, plastic, plastic coated paper of resin impregnated linen, paper, glass fiber cloth, aluminum, or other metals or materials.

In operation, an impact force, such as caused by an errant vehicle, generally designated by the arrow 21, is applied substantially normal to the face of the top sheet 1 so that the abutting edges of the walls of the sheets are forced to cut into or shear into one another and into the foam blocks. Thus, a portion of the downward edge of the wall 3 engages a corresponding portion of the upward edge of the wall 17 and the walls cut or shear into one another at the point of contact. Of course, the walls 3 and 17 also shear into the associated portions of the foam blocks 9 and 19. Likewise, the walls 13 and 15 cut into the walls 5 and 7 and the associated portions of the foam blocks. The shearing action of the walls of the sheets provides a uniform resistance to the impact force 21 and thereby dissipates or absorbs the energy of the force.

As the walls of the sheets shear into one another, the foam blocks 9 and 19 are compressed and thereby generate an additional resisting force that further dissipates the energy of the impact force 21. Thus, the energy of the force 21 is substantially reduced by cutting the foam and the sheets 1 and 11 and by compressing the foam.

The orientation of the walls of the sheets of FIG. 1 and the energy absorbing, cutting or shearing operation of the walls is described in the U.S. Pat. No. to John W. Rich, 3,587,787. However, the lattice structure that is disclosed in the Rich patent has empty cells and, therefore, energy absorption is provided solely by the shearing action of the walls of the structure. The foam-filled structure of the embodiment of FIG. 1 provides an increased energy absorption by compressing the foam and shearing the foam and the walls of the structure.

Also, the walls of the structure of FIG. 1 have an increased strength and rigidity due to the lateral support that is provided by the foam. Accordingly, the walls of the sheets of FIG. 1 are able to shear into one another more consistently. Therefore, the shearing action of the improved structure is generally superior to the shearing action of an empty cell structure which has unsupported walls that may tend to crumple or buckle, rather than to shear. Also, the empty cell structure may expand or shrink under ambient temperature and moisture conditions, while the foam-filled structure of the invention is dimensionally stabilized by the foam and is protected from undesirable moisture by the foam. Moreover, the cell walls of the sheets prevent the foam from unduly expanding in response to a compressive force and thereby enhance the force absorption qualities of the foam.

It should be understood that, although only two stacked sheets are shown in FIG. 1, additional sheets may be arranged in the indicated stacked orientation to provide for increased energy absorption. Also, for simplicity FIG. 1 illustrates two energy absorption sheets having a relatively small surface area. However, it should be understood that the walls of FIG. 1 may be extended and additional walls may be added in the indicated pattern to provide energy absorbing sheets having any desired surface area. Moreover, although polyurethane foam has been suggested as a deformable energy absorbing material, it should be appreciated that any such material may be employed in the indicated manner.

Figure 2:
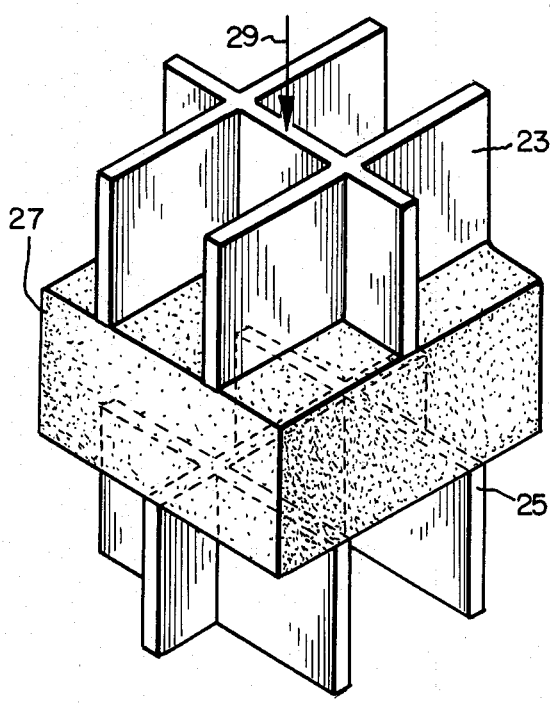
FIG. 2 illustrates a perspective view of an embodiment of the invention wherein a foam block is positioned between lattice sheets having empty cells.

FIG. 2 illustrates a perspective view of an alternative embodiment of the invention wherein empty-cell lattice structures 23 and 25 are positioned at opposite faces of an intermediate foam block 27. In operation, an impact or compressive force applied in the direction of the arrow 29 initially causes the lattice structures 23 and 25 to shear into the intermediate foam block 27 and thereby dissipates a portion of the energy of the applied force. The block 27 may be dimensioned so that the lattice structures 23 and 25 do not begin to shear into one another until the lattices are both fully embedded in the block, for example as shown at FIG. 1. Of course, after the lattice structures are embedded in the block 27, the shearing of the walls of the lattices and the compression of the foam is similar to the shearing and compression that was described for the embodiment of FIG. 1.

It should be appreciated that the embodiment of FIG. 2 may provide an additional energy absorption over the embodiment of FIG. 1, since energy must necessarily be absorbed as the empty lattices 23 and 25 of FIG. 2 shear into the intermediate foam block 27 and this energy absorption is, of course, not provided by the structure of FIG. 1, since the foam is positioned in the cells of FIG. 1 before a compressive force is applied.

Figure 3:
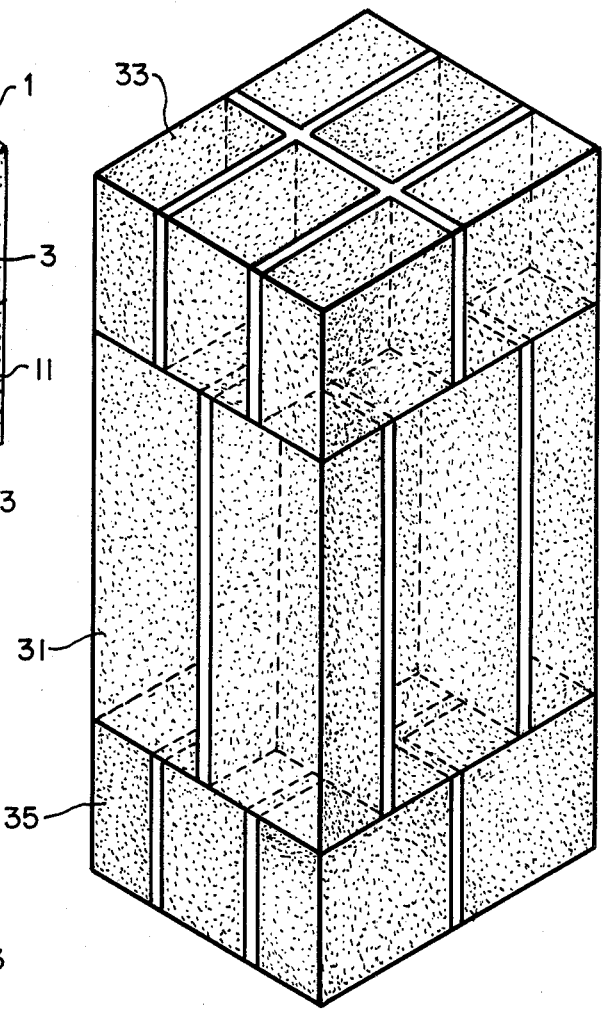
FIG. 3 illustrates a perspective view of an embodiment of the invention wherein an elongated intermediate foam-filled lattice sheet is positioned between shorter foam-filled lattice sheets.

FIG. 3 illustrates a perspective view of an embodiment of the invention wherein an elongated foam-filled lattice structure 31 is positioned between end lattice structures 33 and 35. In operation, when a compressive force is applied, for example to the face of the end lattice structure 33, the end lattice structures are caused to shear into the intermediate lattice structure 31 in the manner described for FIG. 1. However, while the ends of the intermediate lattice structure 31 are shearing into the end lattices, the central foam portion of the structure is compressed or crushed to further absorb energy. Thereafter, when the central portion of the lattice 31 is sufficiently compressed, the end lattice structures 33 and 35 continue to shear into the lattice 31 to provide additional energy absorption.

The embodiments of FIGS. 1-3 illustrate several energy absorbing structures that may be employed in accordance with the invention. However, it should be understood that the invention is not limited to the particular structures shown in FIGS. 1-3 or to the illustrated relative dimensions of the foam blocks or walls. The structures have been illustrated in an expanded format to facilitate an understanding of the invention and therefore, the relative dimensions of the illustration should not be construed to limit the breadth of the invention.

FIG. 4 illustrates a perspective view of two stacked sheets 37 and 39 of energy absorbing material, in accordance with a preferred embodiment of the invention. Each of the sheets of FIG. 4 is shaped by walls of paperboard, or other suitable "shearing" material such as described above, that form a honeycomb structure of foam-filled hexagonal cells.

As indicated for the embodiment of FIG. 1, the honeycomb cells of the preferred embodiment of FIG. 4 are filled with a suitable deformable energy absorbing material, for example polyurethane foam, that is placed in the cells, for example by a chemical foaming action such as is known to the art. It is believed that the hexagonal foam structure of FIG. 4 is superior to other structures, due to its high strength-to-weight ratio, superior percentage of crush and its environmental dimensional stability. Also, the honeycomb cell structure of FIG. 4 appears to have a superior dynamic dimensional stability when compressed. Thus, the hexagonal cells appear to maintain their shape while being pressed in cutting relation and, therefore, the cells apparently provide a superior shearing action for energy absorption.

In operation, an impact force causes the upper honeycomb sheet 37 and the lower honeycomb sheet 39 to shear into one another in the manner described for the embodiment of FIG. 1. Of course, the polyurethane foam of the hexagonal cells is cut as the sheets interpenetrate and is compressed as the walls of the cells shear into one another.

FIG. 5 shows a top view of the two honeycomb sheets 37 and 39 positioned in the preferred orientation of FIG. 4. It has been experimentally determined that, if a plurality of honeycomb sheets are stacked in aligned relation to form an energy absorbing column, there is a tendency for the column to buckle at its center when an axial compressive force is applied. It appears that the transverse shear component of the axial force tends to move the column laterally and thereby causes the undesirable buckling. Accoringly, if alternate sheets of the column are placed so that adjacent abutting sheets are angularly displaced with respect to one another, the tendency to buckle is greatly reduced. An alternate 90° orientation for abutting sheets has been found acceptable, for reduced buckling and ease of manufacture, when the sheets are formed with the illustrative hexagonal cells.

In practice, it is preferable to have honeycomb sheets with empty cells that have low cell length to mean cell diameter ratios and that are stacked with the indicated alternate 90° orientation. Polyurethane is then foamed within the structure of the stacked honeycomb sheets to fill the cells of the sheets and to hold the sheets together. It should be understood that any number of honeycomb sheets may be used to form an energy-absorbing stack having a desired energy absorption characteristic.

FIG. 6 illustrates a perspective view of a container 41 that is employed to retain one or more stacks of the energy absorbing sheets of the invention. The stacks are oriented in the container to absorb the energy of an impact force that is applied, for example, in the direction of the arrow 42. The container of FIG. 6 is preferably made of a material, such as polyethylene, that will protect the sheets from moisture and that will deform so that an impact force will be transmitted to the retained sheets. Also, the polyethylene container will retain the crushed sheets after the impact and will thereby facilitate the subsequent clean-up process. Of course, the container 41 may be constructed of other suitably waterproof, durable and deformable materials. The body of the container 41 may be constructed from a single sheet of polyethylene that is left open at its bottom so that appropriately aligned honeycomb sheets may be inserted. After the sheets are placed in the container, a relatively rigid panel 43 is affixed to the body of the container by screws 45 by other suitable fastening means.

It has been experimentally determined that the impact force of an automobile will cause the panel 43 to break away from the sides of the container 41 but remain attached to the ends of the container. The partially detached panel 43 will allow the air within the container and within the foam of the honeycomb sheet to escape as the sheets and the container are crushed. Generally, the partially detached panel 43 will not allow pieces of the crushed honeycomb sheets to fall from the container. However, if it is desired to provide an additional means for retaining the crushed sheets while allowing air to escape, an inner deformable and breathable bag 46, for example of woven polypropylene or burlap, may be placed inside the container 41 to hold the honeycomb sheets. The container 41 can be designed as a moisture-proof environmental barrier or alternatively, the contents of the container can be placed within a sealed bag made from a deformable material, such as plastic.

Figure 7:
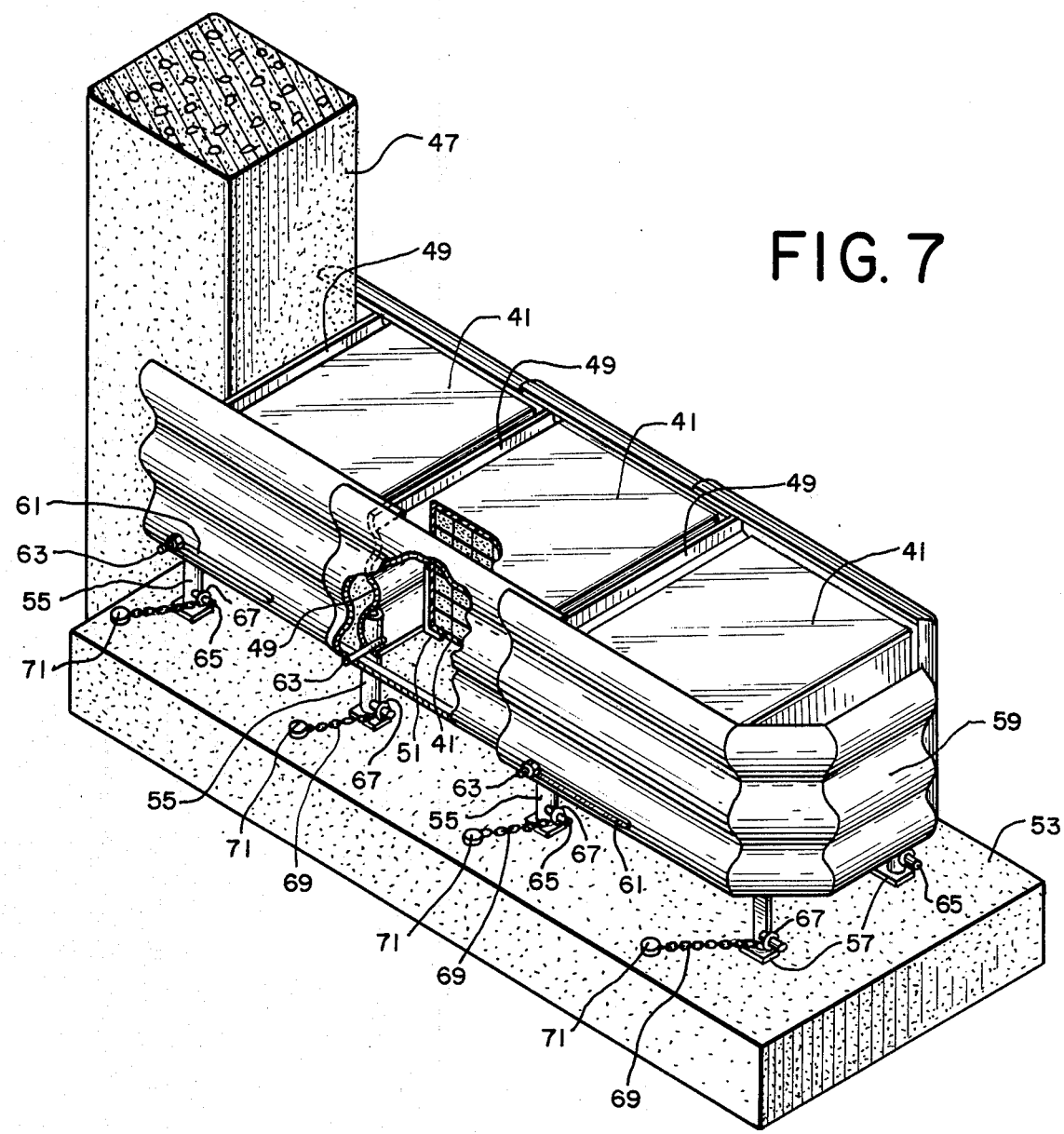
FIG. 7 is a perspective view of a telescoping guard rail retaining frame for the container of FIG. 6.

FIG. 7 illustrates a perspective view of a U-shaped guard rail that may be employed to support loaded containers 41 in an aligned relation. The guard rail of FIG. 7 is positioned in front of and is firmly affixed to a sturdy anchoring structure, for example a concrete post 47. As shown in FIG. 7, the containers 41 that hold the stacked energy absorbing honeycomb sheets are placed within telescoping U-shaped sections of the guard rail and are retained against corrugated end walls 49. The containers are supported by L-brackets 51 that are affixed, for example by bolts, to the end walls 49.

The guard rail structure is slidably supported on a concrete pad 53 by legs 55 that have slidable feet or skids 57. The guard rail frame has a plurality of telescoping U-shaped corrugated sections that are collapsed into one another when an axial impact force is applied at a nose section 59. Each section telescopes by sliding axially on a bolt 63 along a slot 61.

Each leg 55 of the telescoping guard rail has an associated forwardly extending peg 65 that is slidably engaged with a ring 67. The ring 67 is affixed to one end of a chain 69 and the other end of the chain is firmly affixed to the concrete pad 53 by a bolt 71. In operation, if a vehicle hits the nose section 59 of the telescoping guard rail, the axial component of the impact force of the vehicle causes the forward section of the guard rail to move axially on the skids 57 of the associated legs 55 and, as the section telescopes along the slot 61, the rings 67 of the sliding legs fall from the associated pegs 65. As the front section of the guard rail telescopes, its container 41 is crushed and thereby absorbs a portion of the impact energy of the vehicle. It should be understood that successive sections of the guard rail will telescope and the associated containers 41 will be crushed to further absorb the impact energy of the vehicle. The telescoping operation of the guard rail of FIG. 7 is described in the United States patent to Walker, No. 3,982,734, and the subject matter of the patent is incorporated herein by reference.

Figure 8:
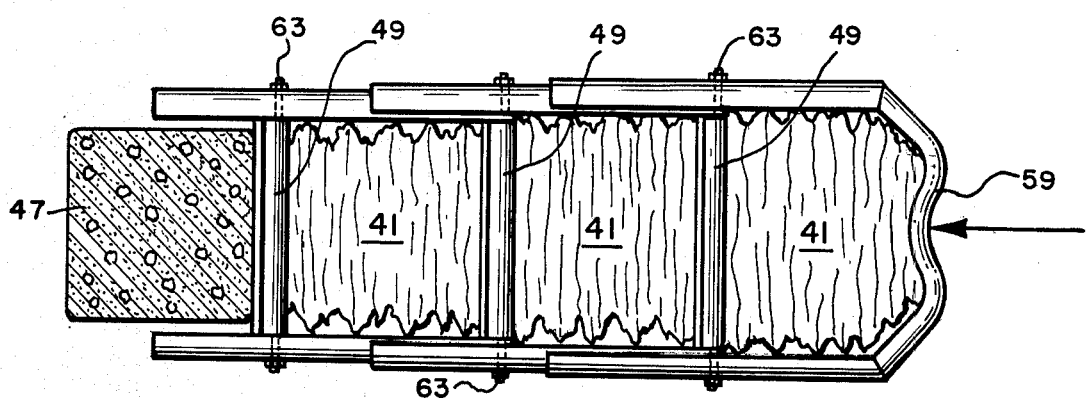
FIG. 8 is a top elevation view of the retaining frame of FIG. 7 in a crushed or compressed condition.

FIG. 8 is a top elevation view of the telescoping guard rail frame of FIG. 7, after the nose of the frame has been hit by a vehicle. As shown in FIG. 8, the U-shaped sections have telescoped into one another and the associated containers 41 have been crushed to absorb the impact energy.

If the structure of FIG. 7 is hit transversely by a vehicle, the rings 67 are retained on their associated pegs 65 and the chains 69 thereby resist the transverse impact force so that the impacting vehicle is forced to rebound from the guard rail. A transverse impact should not crush the containers 41.

Although the container 41 of FIG. 6 and the telescoping guard rail frame of FIGS. 7 and 8 are preferred for use with the energy absorbing material of FIGS. 1-6, it should be appreciated that other shapes and sizes of containers and other container support apparatus may be employed in conjunction with the energy absorbing material of the invention to dissipate impact energy, without departing from the spirit of the invention. Thus, the invention may be embodied in other specific forms without departing from its spirit or essential characteristics. The present embodiments are, therefore, to be considered in all respects as illustrative and not restrictive, the scope of the invention being indicated by the claims rather than by the foregoing description. Accordingly, all changes which come within the meaning and range of the equivalents of the claims are intended to be embraced therein.

I claim:

1. An energy absorbing apparatus comprising:
   a plurality of energy absorbing sheets arranged in a stacked relation for compressing and cutting into one another to dissipate the energy of an impact force, each sheet having
   an array of intersecting walls for defining a plurality of cell areas, and
   filler means for filling said cell areas and adapted to deform to absorb the energy of the impact force and to support said walls so that the edges of the walls of abutting sheets cut into one another and into said filler means in response to said impact force, to dissipate the energy of the impact.

2. The energy absorbing apparatus of claim 1 further including at least one deformable container for holding said energy absorbing sheets.

3. The energy absorbing apparatus of claim 2 wherein said deformable container is a polyethylene box.

4. The energy absorbing apparatus of claim 2 further including a breathable liner bag disposed in said container for holding said energy absorbing sheets when the container and the sheets are crushed by said impact force.

5. The energy absorbing apparatus of claim 4 further including a moisture resistant bag disposed in said container and enclosing said liner bag and said energy absorbing sheets for protecting the sheets and the liner bag from moisture.

6. The energy absorbing apparatus of claim 1 wherein said cell areas are hexagonal in cross section.

7. The energy absorbing apparatus of claim 1 wherein the cell areas of abutting energy absorbing sheets are oriented in an angularly displaced relation for maintaining a uniform inter-sheet cutting action in response to said impact force.

8. The energy absorbing apparatus of claim 7 wherein said cell areas are hexagonal in cross-section and said abutting sheets are angularly displaced by about 90°.

9. The energy absorbing apparatus of claim 1 wherein said filler means is a foamed plastic material.

10. The energy absorbing apparatus of claim 1 wherein said filler means is a polyurethane foam.

11. The energy absorbing apparatus of claim 1 further including:
    a plurality of deformable containers, each container having means for holding a plurality of said stacked energy absorbing sheets, and
    a retaining frame for supporting a plurality of the loaded deformable containers in alignment and for allowing successive containers to collapse and thereby dissipate said impact force.

12. The energy absorbing apparatus of claim 11 wherein said retaining frame includes a plurality of nested retaining units for telescoping in response to an axial impact force to successively crush said supported loaded deformable containers.

13. The energy absorbing apparatus of claim 12 wherein said retaining frame has a plurality of legs for slidably supporting the retaining frame on a support surface and each leg includes,
    a forwardly extending peg,
    a ring slidably engaged with the peg, and
    a chain affixed at one end to the ring and at the other end to said support surface for maintaining the leg in a fixed position to resist transverse impact forces and for disengaging from said peg to allow axial sliding movement of the leg in response to an axial impact force.

14. The energy absorbing apparatus of claim 1 wherein said filler means includes a plurality of panels of deformable energy absorbing material, each panel disposed between two stacked energy absorbing sheets for interpenetrating with the sheets and filling the cell areas of the sheets in response to said impact force.

15. The energy absorbing apparatus of claim 1 wherein at least one of said energy absorbing sheets has walls for defining cell areas that are longer than the cell areas of abutting sheets.

16. An energy absorbing apparatus, comprising:
    a plurality of energy absorbing sheets for dissipating the energy of an impact force, each sheet having a honeycomb lattice of hexagonal cells uniformly aligned with cell faces lying in the plane of the face of the sheet and cell walls extending to define cutting edges; and
    filler means disposed in the hexagonal cells of each sheet for deforming to absorb the energy of said impact force and for holding said sheets in a stacked relation and orienting the cutting edges of the walls of the cells in abutting sheets to shear into one another and said filler means in response to said impact force.

* * * * *

UNITED STATES PATENT AND TRADEMARK OFFICE
CERTIFICATE OF CORRECTION

PATENT NO. : 4,352,484
DATED : October 5, 1982
INVENTOR(S) : David C. Gertz and Owen S. Denman It is certified that error appears in the above-identified patent and that said Letters Patent is hereby corrected as shown below:

At column 3, line 32, delete "of" and insert --or--.

At column 5, line 50, delete "Accoringly" and insert --Accordingly--.

At column 5, line 56, delete "illustrative" and insert --illustrated--.

At column 5, line 65, delete "energy-absorbing" and insert --energy absorbing--.

At column 8, line 4, delete "cross section" and insert --cross-section--.

Signed and Sealed this

Fourteenth Day of June 1983

[SEAL]

Attest:

DONALD J. QUIGG

Attesting Officer          Acting Commissioner of Patents and Trademarks